United States Patent
Mehta et al.

(10) Patent No.: US 7,778,659 B2
(45) Date of Patent: Aug. 17, 2010

(54) MULTIPLE ACCESS BY VARYING RECEIVED POWER IN WIRELESS NETWORKS

(75) Inventors: Neelesh B. Mehta, Needham, MA (US); Andreas F. Molisch, Arlington, MA (US); Raymond Yim, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 578 days.

(21) Appl. No.: 11/780,578

(22) Filed: Jul. 20, 2007

(65) Prior Publication Data

US 2009/0022170 A1    Jan. 22, 2009

(51) Int. Cl.
*H04B 7/00* (2006.01)
(52) U.S. Cl. ............... 455/522; 455/69; 455/67.11
(58) Field of Classification Search ............ 455/525, 455/436, 439, 67.11, 550.1, 522, 69; 370/338, 370/347, 345, 410
See application file for complete search history.

(56) References Cited

U.S. PATENT DOCUMENTS

| | | | |
|---|---|---|---|
| 2003/0058826 A1* | 3/2003 | Shearer, III | 370/338 |
| 2004/0032847 A1* | 2/2004 | Cain | 370/338 |
| 2004/0214591 A1* | 10/2004 | Lott et al. | 455/522 |
| 2005/0250497 A1* | 11/2005 | Ghosh et al. | 455/436 |
| 2006/0198477 A1* | 9/2006 | Moorti et al. | 375/347 |
| 2007/0005296 A1* | 1/2007 | Beresniewicz et al. | 702/181 |
| 2008/0112387 A1* | 5/2008 | Gandham et al. | 370/345 |
| 2008/0181170 A1* | 7/2008 | Branlund et al. | 370/328 |
| 2009/0117851 A1* | 5/2009 | Malaney | 455/67.11 |

FOREIGN PATENT DOCUMENTS

WO    0154299 A2    7/2001

* cited by examiner

*Primary Examiner*—Tan Trinh
(74) *Attorney, Agent, or Firm*—Dirk Brinkman; Gene Vinokur

(57) ABSTRACT

The invention describes a method for transmitting a packet in a wireless network of nodes. At a beginning of a scheduled time slot a metric in the node is set, in which the metric indicates a need to transmit a packet to a receiver in the wireless network. The metric is mapped to a received power level and the packet is transmitted at a transmit power level so that the received power level is achieved at the receiver.

20 Claims, 7 Drawing Sheets

MULTIPLE ACCESS BY VARYING RECEIVED POWER IN WIRELESS NETWORKS

FIELD OF THE INVENTION

This invention relates generally to multiple access in a wireless network of nodes, and more particularly at controlling power in transmitters.

BACKGROUND OF THE INVENTION

Multiple Access

Multiple access is a fundamental problem in wireless networks, such as cellular systems, ad hoc networks, sensor networks, cooperative and collaborative communication networks, relay networks, and the like. Multiple access enables multiple contending transceivers to access the network, i.e., transmit and receive packets. The tranceivers are also referred to as nodes, users or mobile stations (MS). A large number of protocols are known to solve the multiple access problem. The protocols use either contention-free or contention-based access.

Contention Free Access Protocols

In the contention free access case, each node is allocated a reserved time slot, frequency, and/or spreading code, which the node can use to transmit packets with little or no interference. The allocation is typically performed by a centralized radio resource management entity, such as a base station (BS), access point, or 'receiving' node. However, the efficiency of such schemes can he low, especially when the traffic is 'bursty'. Furthermore, contention-free access schemes usually require centralized control, which in turn necessitates an overhead that makes those schemes less desirable for handling a network: with a larger number of nodes, e.g., hundreds or thousands.

Contention Based Access Protocols

Contention based access protocols can be implemented in a distributed way. Each node transmits whenever the node has packets to send. This can lead collisions, in which packets transmitted concurrently by different nodes overlap and interfere with each other at the receiving node (receiver).

The design of multiple access schemes has traditionally attempted to ensure that each node has a fair chance of accessing the channel, on average. However, in problems such as multi-user diversity in the uplink of a cellular system, the aim of the multiple access scheme changes to quickly selecting, at any point in time, the node with the highest channel gain to the BS.

In one scheme, a pilot signal is broadcast periodically by the BS to all mobile stations (MSs) to enable each MS to determine its channel gain and feed the channel gain back to the BS. Then, the BS schedules a downlink or uplink transmission for the best node.

Another example that arises in a very different setting is relay selection in cooperative communication systems. In that setting, the source node needs to select the best relay node to forward its message to the destination node. Notice in all the above examples that: local channel knowledge gives the node an estimate of its relative importance and usefulness.

A common assumption in the design of multiple access schemes is that when packets interfere with each other, none of the colliding packets can be decoded properly. However, that collision model is a coarse and pessimistic way to model a wireless physical layer that handles interference. So long as the power of one received signal is sufficiently stronger than the interference power, the receiver could perhaps decode the stronger signal. This statement is valid even if no special measures for interference mitigation, such as multi-user detection or smart antennas, are used.

MPR

A generalization of signal acquisition and decoding is called multi-packet reception (MPR). Methods for achieving MPR include space-time coding, multiple input multiple output signaling, spread spectrum modulation, frequency hopping, and multiple access coding. Signal acquisition is exploited in many systems, such as Aloha networks, IEEE 802.11 compliant systems, Bluetooth radios, and cellular systems. The collision model ignores the fact that the powers of received signals are often asymmetric due to different path losses or different transmitted powers of the nodes—both of which actually aid signal acquisition.

Some methods exploit local channel knowledge to improve the efficiency of contention-based multiple access. One channel-aware Aloha scheme incorporates channel knowledge to control channel access. Each node transmits only if its channel gain exceeds a system-determined threshold. An opportunistic Aloha (O-Aloha) protocol sets the probability of transmission as a function of local channel knowledge, which is only required to be known locally at the respective contending transmitters. Thus, transmitters with a high channel gain are more likely to attempt a transmission.

Note, none of the above multiple access schemes attempts to adjust the power of the transmitted signal.

SUMMARY OF THE INVENTION

In a wireless system of nodes, which uses contention-based multiple access (MA), the invention increases the probability that a packet transmitted by a best node is decoded successfully by a receiver. The "best" node is defined herein as the node having a highest metric. The metric generally defines a 'need' to access the network, where the metric can depend on a specific application or system being considered, e.g., the metric can be based on priority, possible power/energy reduction, channel gain, etc. The invention assumes the nodes have local channel state information, and can adjust their power.

The invention varies the power of signals transmitted to communicate a packet to a receiver. The power is such that a signal-to-interference-and-noise ratio (SINR) of the received signal enables, with a good probability, successful decoding of the packet at the receiver from the best user even when a collision occurs. The best node is the node with the highest metric related to a need to transmit a packet.

According to the invention, the optimal strategy is to transmit packets in such a way that the power of the received signal is a function of the metric, e.g., one of a set of discrete power levels. The invention provides a complete characterization of the optimal transmit strategy for the case that only two nodes are present in the network, as well as iterative process for the transmission strategy in the case that the number of transmitting nodes is larger than two, and possibly unknown.

DETAILED DESCRIPTION OF THE PREFERRED EMBODIMENTS

Figure 4:
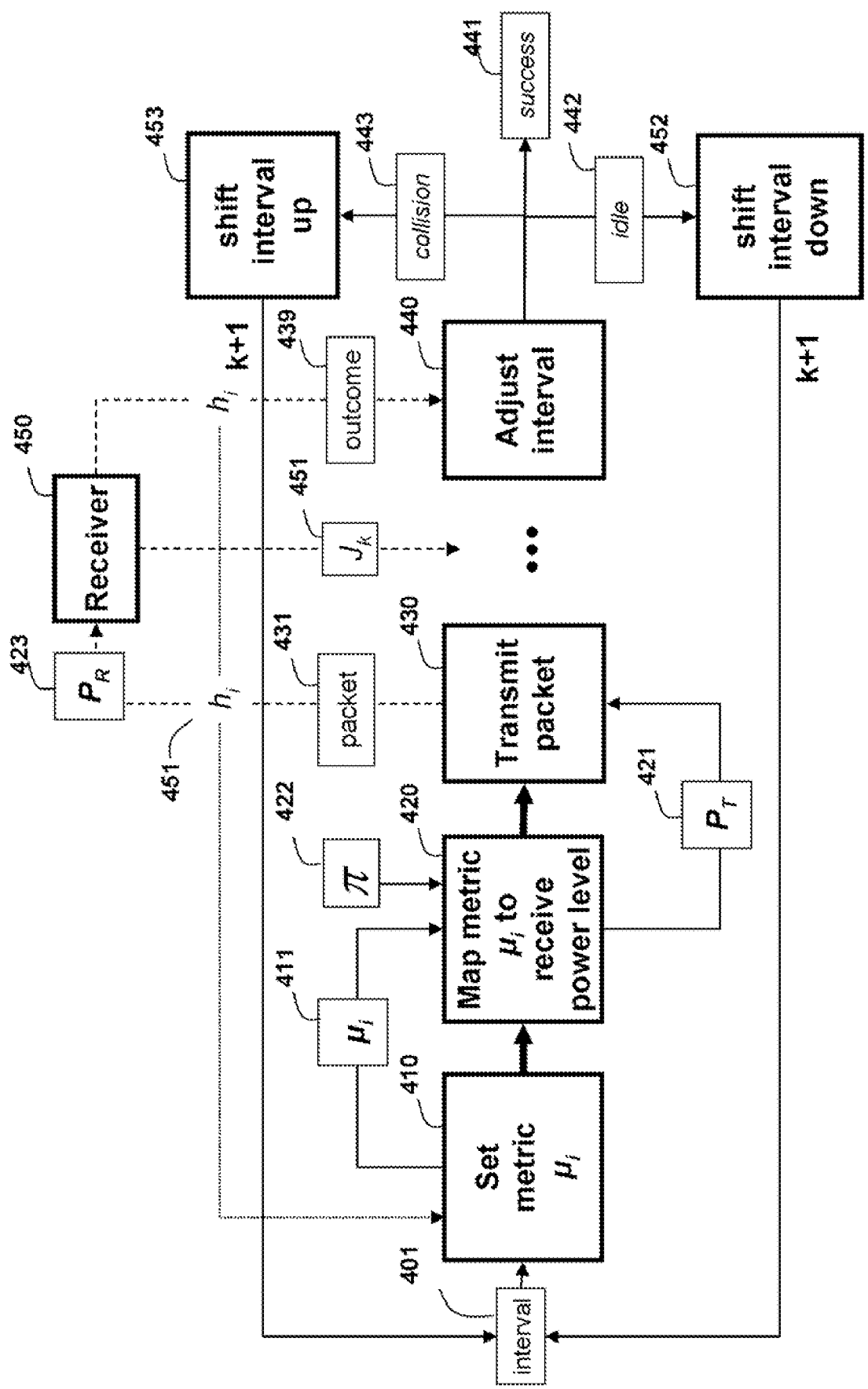
FIG. 4 is a flow diagram of a method for transmitting a packet according to an embodiment of the invention.

As shown in FIG. 4, the embodiments of our invention provide a method for transmitting a packet 431 to a receiver 450 in a wireless network that has N≧2 nodes, e.g., mobile telephones, sensors, relays, MS or 'users'. The receiver can be a resource management node, e.g., a base station (BS) or access point (AP). All nodes can operate as transceivers. Note that, as per an embodiment of the invention, the nodes can be either half duplex i.e., can either transmit or receive at any given time, but not do both, or be full duplex, i.e., the node can transmit or receive at any time, At the beginning of each regularly scheduled transmit time slot, each node i sets 410 a metric $\mu_i$ 411, which describes a relative need to transmit a packet. The metric can be interpreted as a relative importance that the node ascribes to itself. For example, the metric can be selected from the following group of criteria: local channel measurements such as channel gain, priority, SINR, amount of data to transmit, real-time feedback power reduction, increased bandwidth, extending the network range, and any combinations thereof. It is understood that other metrics can be used as well, within the embodiments of the invention.

Best Node has Highest Metric

Hereinafter, the node with the highest metric is called the best node. Typically, the highest metric of the best node is substantially greater than the metrics of most of the other nodes, although this is not necessary to work the invention. Generally, the metrics of different nodes are random variables. The set of all N nodes in the network is N={1, ..., N}.

A channel gain $h_i$ 451 between the transmitting mobile node i and the receiver node (BS) 450 is known at the mobile node. The receiver can decode the packet transmitted by node i successfully if a ratio of the power $P_i$ of the received signal to the interference of the power of the other interfering signals $P_{j\neq i}$ plus the power $\sigma^2$ of the noise (SINR-signal interference plus noise ratio), exceeds a threshold $\bar{\gamma}$:

$$\frac{P_i}{\sum_{j\neq i} P_j + \sigma^2} \geq \bar{\gamma}, \quad (1)$$

where $P_i$ is the power of the signal received from node i, $\sigma^2$ is the noise power, and $\bar{\gamma} \geq 1$ is a threshold that depends on the modulation and coding used for the packet transmission 430. Thus, the packet 431 can be decoded successfully even when two or more nodes transmit concurrently.

Mapping Functions

Figure 1A:
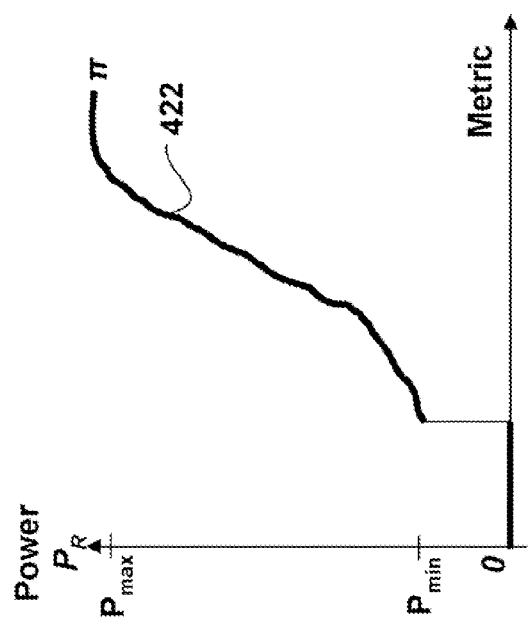
FIGS. 1A-1D are graph of received power as a function of a normalized metric according to an embodiment of the invention.
Figure 1C:
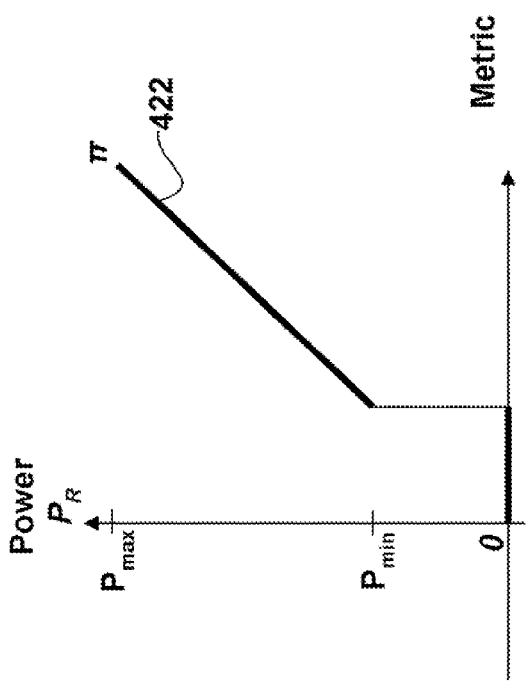
Figure 1B:
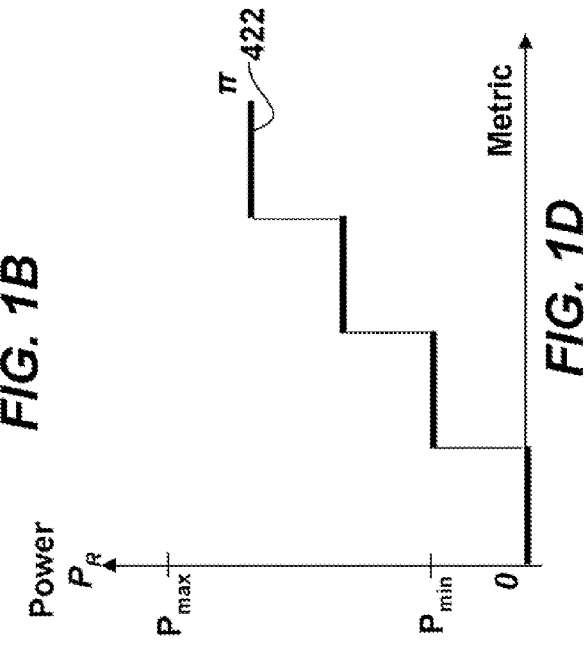
Figure 1D:
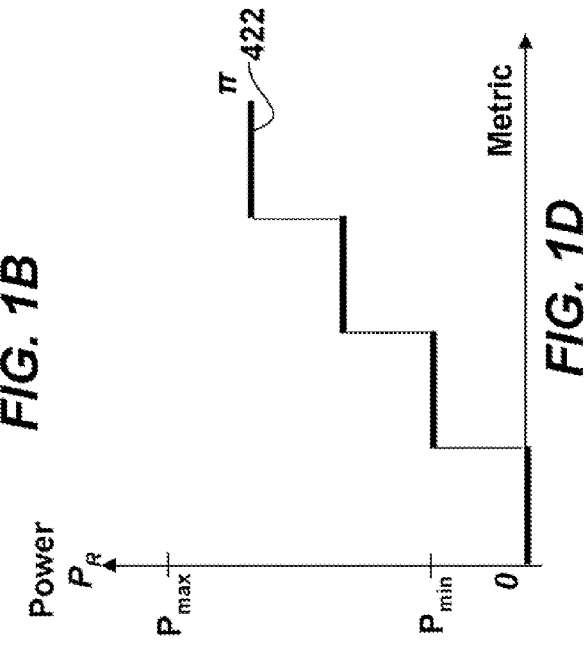
Figure 1E:
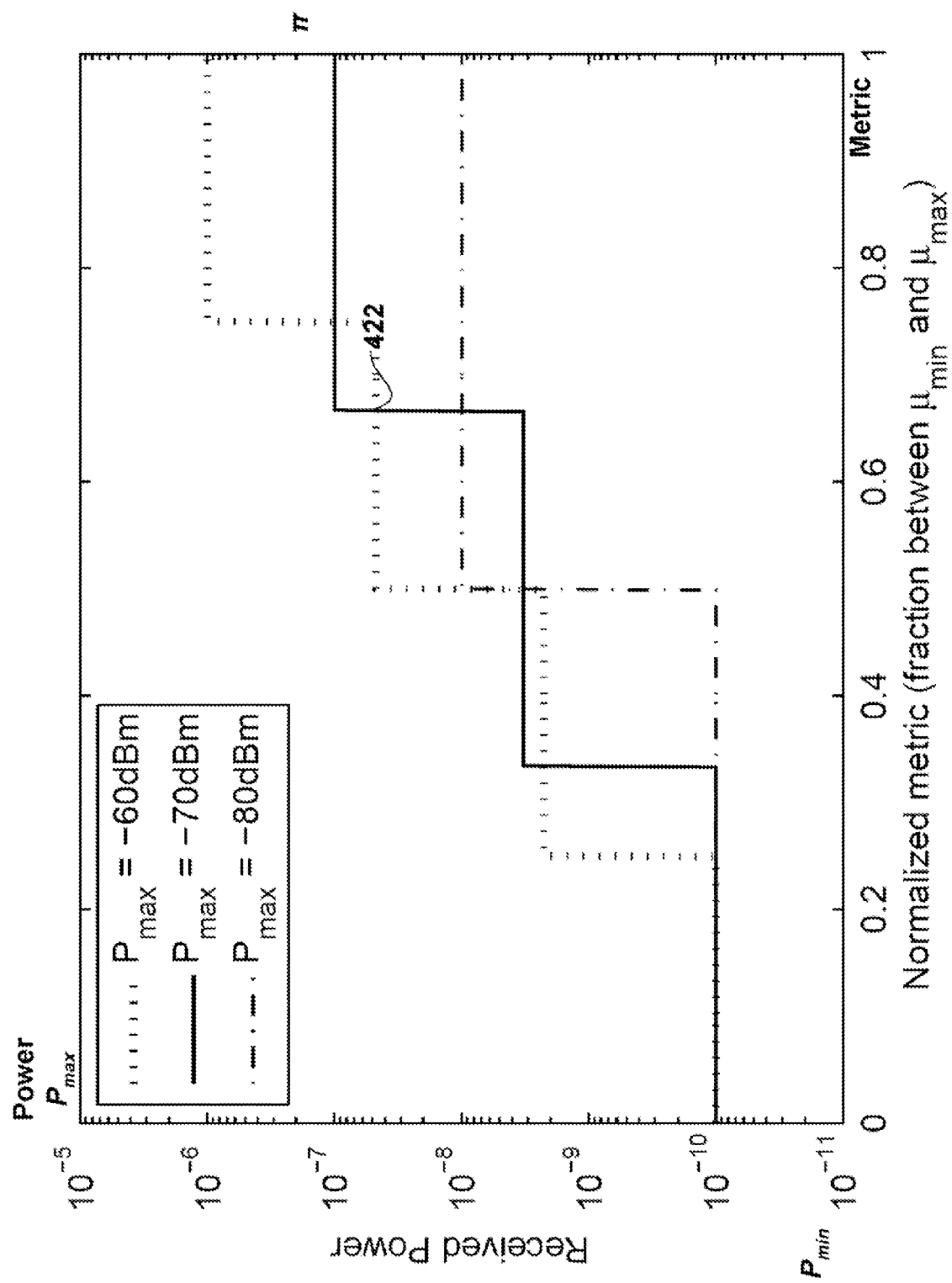
FIG. 1E is a graph of received power having discrete levels according to a preferred embodiment of the invention.

FIGS. 1A-1D show various mapping functions π 422 that map the metric (horizontal axis) to received power (vertical) axis. FIG. 1A shows a mapping where the power level is zero for low values of the metric, and then increases linearly for higher values. The mappings in FIGS. 1B-1C are similar for low values of the metric, but then increases non-linearly. FIG. 1D shows a mapping for discrete monotonically non-decreasing power levels. FIG. 1E shows the mapping of FIG. 1D in greater detail.

Received Power

As shown logarithmically in FIGS. 1A-1E, the power of the received signal from any node lies between $P_{min}$ and $P_{max}$, where $P_{max}$ is obtained by considering the maximal transmitted power and the worst-case channel gain, and $P_{min}$ can be 0, i.e., the node does not transmit at all.

We regulate the power of the transmitted signal so that the desired received signal has a predetermined power level that corresponds to the metric. The power of the received signal depends on the dynamic range of the transmit power. The desired received power can also be modified according to an amount of uncertainty in the metric. For example, a spacing between the discrete power levels described above can be made larger if there is a high degree of uncertainty in the metric, such as the estimated channel gain.

Our invention operates in a time-slotted network. At the beginning of each regularly scheduled time slot, each node independently decides, depending on criteria specified below, whether or not to transmit a packet by setting 410 the metric 411 appropriately. If the node transmits a packet, then the node ensures that the received power 423 is $P_T = \pi(\mu)$, which depends on the metric 411 set 410 in the node. That is, the node transmits at a power of $\pi(\mu)/h_i$, where π 422 is a mapping function described in greater detail below.

At the end of every time slot, one of three outcomes 439 is possible. If no node transmits in the slot, the outcome is idle 442. If the received powers are such that the signal of exactly one of the transmitting nodes can be decoded per Equation (1), then the outcome is a success 441. Otherwise, if none of the transmitted signals can be decoded, the outcome is a collision 443. The receiver 450 broadcasts the outcome 439 at the end of every time slot.

Our goal is to design the multiple access mechanism so that the received packet that is decoded successfully is transmitted by the node with the highest metric, and that this packets has a highest priority. Recall that a node with metric μ 411 transmits with a power $P_T$ 421 such that the power $P_R$ 423 of the received signal is $\pi(\mu)$.

Simultaneous Transmissions from Two Nodes

We first describe the invention for the relatively simple case where exactly two nodes, a and b, concurrently transmit packets with corresponding metrics $\mu_a < \mu_b$. The invention provides the optimal mapping function π that maximizes the probability that the receiver decodes the packet from node b successfully. We assume initially that the metrics are uniformly distributed in a predefined half-closed interval $[\mu_{min}, \mu_{max})$ 401. Then, we generalize to the case where the metrics have arbitrary probability distributions. Specifically, we first maximize the probability Pr that the packet from node b is decoded successfully during a simultaneous transmission by at least two nodes.

This optimization problem is $$\max_\pi Pr\left\{\frac{\pi(\mu_b)}{\pi(\mu_a) + \sigma^2} \geq \bar{\gamma}\right\}, \quad (2)$$

subject to $$\pi(\mu_{min}) \geq P_{min} \quad (3)$$

and $$\pi(\mu_{max}) \leq P_{max}$$

It is important that the mapping function selects the node with the highest metric. If the mapping function obeys this condition, then the function is valid. That is, a mapping $\pi(.)$ is valid if and only if $\pi(\mu_a) < \bar{\gamma}(\pi(\mu_b) + \sigma^2)$ for all metrics $\mu_a < \mu_b$. Because the SIRN threshold $\bar{\gamma} \geq 1$, this implies that all monotonic non-decreasing (MND) functions are valid power mappings.

However, there are also valid mappings that are not monotonic non-decreasing, i.e., $\pi(\mu_a) > \pi(\mu_b)$ for some $\mu_a < \mu_b$. One example occurs when $P_{max} < \bar{\gamma}(P_{min} + \sigma^2)$. In this case, all functions are valid and optimal, as they all result in a zero probability of success, which is the only value possible.

Because the goal of our multiple access method is to maximize the probability of decoding the packet transmitted by the best node with the highest metric, we only consider MND functions. This idea is formalized below as we show that an optimal mapping is indeed a MND function $\pi(.)$.

The optimal mapping that is not necessarily MND is $\pi_{opt}(\mu)$. We can 'sort' this mapping by considering its cumulative distribution function when the metrics $\mu$ are uniformly distributed in the predefined half-closed interval $[\mu_{min}, \mu_{max})$ 401. That is, if we consider the mapping $$\pi(\mu') = \qquad (4)$$

$$P_{min} + Pr\left(\pi_{opt}(\mu) < P_{min} + (P_{max} - P_{min})\frac{\mu' - \mu_{min}}{\mu_{max} - \mu_{min}}\right)(P_{max} - P_{min}),$$

for $\mu' \in [\mu_{min}, \mu_{max})$, then $\pi(\mu')$ is MND and has the same power distribution as $\pi_{opt}(\mu)$. Clearly, such a sorting does not affect the probability of success.

However, the optimal MND in fact maps 420 the metrics into a set of Q of discrete power levels. The number of levels depends on the dynamic power range $P_{min}$ and $P_{max}$. A function $\pi(\cdot)$ that optimizes the probability of success in Equation (2) maps the metrics into (L+1) discrete power levels in the set $Q = \{q, q_1, \ldots, q_L\}$, see FIG. 3, such that $$L = \left\lfloor \log_{\bar{\gamma}}\left(\frac{(\bar{\gamma}-1)P_{max} + P_{min}}{\bar{\gamma} P_{min}}\right)\right\rfloor, \qquad (5)$$

and $$q_i = \bar{\gamma}^i P_{min} + \sigma^2 \bar{\gamma} \frac{\bar{\gamma}^i - 1}{\bar{\gamma} - 1}, \ 0 \leq i \leq L. \qquad (6)$$

The proof is given in Appendix A. The power levels in Equation (6) result from setting $q_0 = P_{min}$, and minimizing the gap between the adjacent power levels. While the above solution is optimal, the solution need not be unique. For example, when $q_L < P_{max}$, the largest power level can be increased without affecting the probability of success. Furthermore, appropriately scaling the metrics, while still ensuring that there are (L+1) levels below $P_{max}$, also ensures the same probability of success and results in a different optimal solution.

Nodes with metrics 441 in the half-closed interval $[m_i, m_{i+1})$ are mapped to received powers $q_i$ 423, for $0 \leq i \leq L$, with $m_0 = \mu_{min}$ and $m_{L+1} = \mu_{max}$.

The following provides a complete characterization of the optimal power mapping function 422 as shown in FIG. 1D. However, it should be noted that other linear or non-linear mappings can also be used.

If $$m_i = \mu_{min} + \left(\frac{\mu_{max} - \mu_{min}}{L+1}\right)i, \ 0 \leq i \leq L+1, \qquad (7)$$

then an optimal power mapping that optimizes the probability of success in Equation (2) sets $$\pi(\mu) = q_i, \text{ if } m_i \leq \mu < m_{i+1}. \qquad (8)$$

The corresponding optimal probability of success is $$P_{mn}^{\pi} = 1 - \frac{1}{L+1}. \qquad (9)$$

The proof is given in Appendix B. The optimal support includes equal size intervals: $m_{i+1} - m_i = m_i - m_{i+1}$, for $1 \leq i \leq L$. A larger dynamic range in the received power allows a larger value for the number of power levels L, which increases the success probability by improving the probability that the signal received from the best node signal can be decoded. The following generalizes metrics with arbitrary (non-uniform) probability distributions.

The optimal power mapping 420 for the metric $\mu$ 411 with a monotonically increasing cumulative distribution function (CDF) $F(\mu)$ in the half-closed interval $[\mu_{min}, \mu_{max})$ 401 is $$\pi(\mu) = q_i, \text{ if } \frac{i}{L+1} \leq F(\mu) < \frac{i+1}{L+1}, \qquad (10)$$

for levels $0 \leq i \leq L+1$. The proof follows from Equations (7-9) and the following two observations: (i) the CDF $F(\mu)$ is uniformly distributed regardless of the probability distribution of the metric $\mu$, and (ii) the CDF $F(\mu)$ is monotonically increasing in $\mu$, which implies that there is a many-to-one mapping between $\mu$ and $F(\mu)$. To guarantee that the packet 431 by a single node in a time slot can be decoded successfully by the receiver 450, we always set $P_{min} = \sigma^2 \bar{\gamma}$.

FIG. 1D shows optimal power mapping functions and dependences on the dynamic range $P_{min}$ and $P_{max}$, when the metric is uniformly distributed. The received power is a function of the normalized metric $(\mu - \mu_{min})/(\mu_{max} - \mu_{min})$ for different values $P_{max}$ for two contending nodes, and $\sigma^2 = -110$ dBm, and $\bar{\gamma} = 10$ dB for example.

Figure 2:
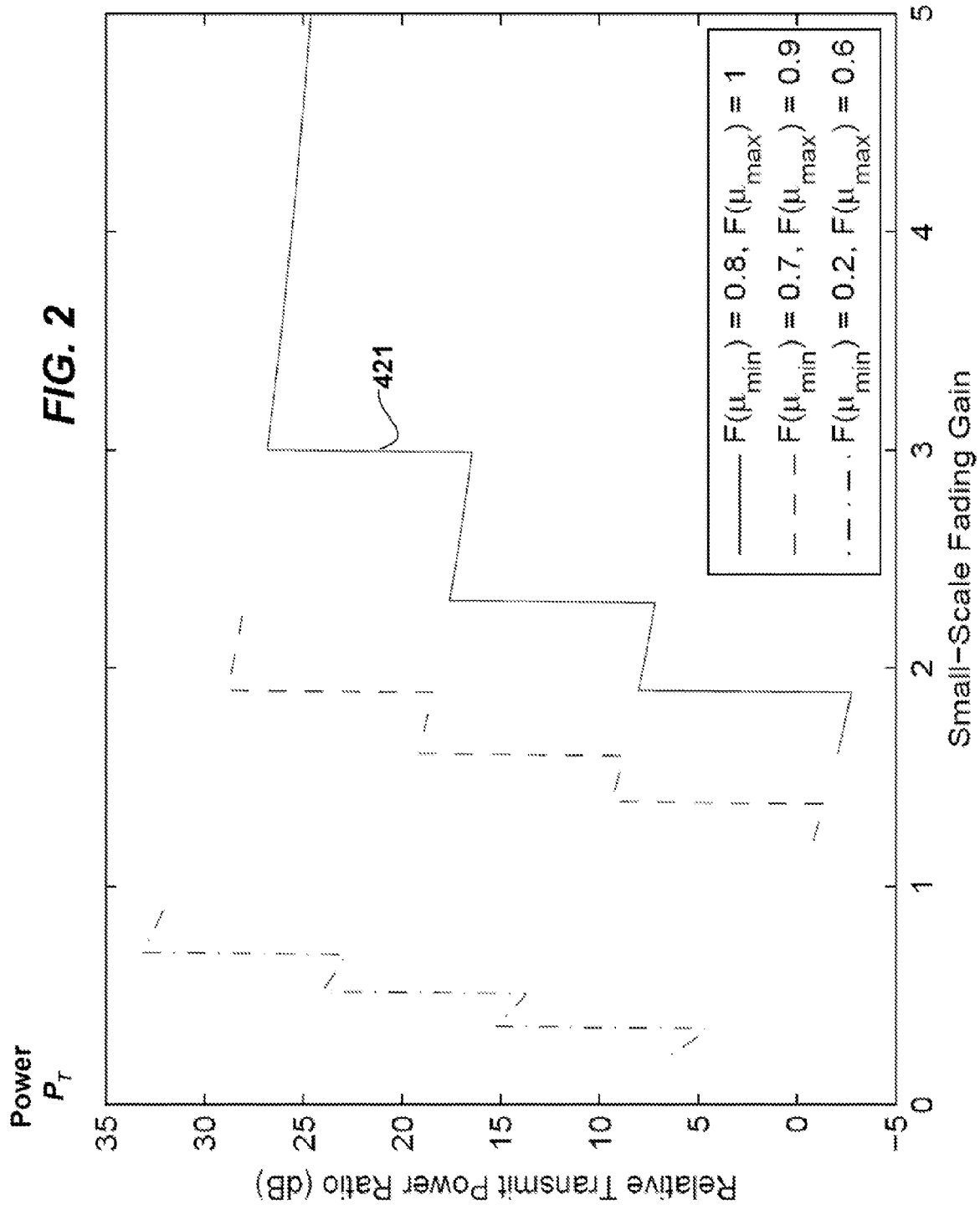
FIG. 2 is a graph of transmitted power as a function of small scale fading gain according to an embodiment of the invention.

FIG. 2 shows the variation of the transmitted power $P_T$ 423 of the node when the node follows the optimal received power mapping shown in FIG. 1D. Note, the transmitted power is different than the received power. This is due to fast fading of the received signal. Fast fading is also known as multipath fading or small scale fading. Small scale fading occurs when there is relatively small movement of a mobile node such as a cellular telephone. The loss in signal strength is caused by the destructive interference of multiple reflected copies of the signal. In FIG. 2, the transmitted power $P_T$ is normalized with respect to $P_{min}$ as a function of the small scale fading gain $\alpha_i$, for different values of $\mu_{min}$ and $\mu_{max}$. In multi-user diversity, an ideal proportional fair scheduler at the base station selects the node with the highest short-term fading gain.

The channel (power) gain of a node i is $h_i = \bar{h}_i \alpha_i$, where $\bar{h}_i$ includes path loss, shadowing, and antenna gain, and $\alpha_i$ is due to short-term Rayleigh fading with parameter $\lambda = 1$. The fading gain $\alpha_i$ has an exponential distribution with unit mean. In this case, the metric is $\mu = h_i / \bar{h}_i = \alpha_i$. The CDF is $$F(\mu) = 1 - e^{-\mu}, 0 \leq \mu < \infty. \qquad (11)$$

A node i contends with a transmitted power that equals $\pi(\alpha_i)/h_i$. FIG. 2 shows the transmitted power normalized with respect to $P_{min}$, i.e., $\pi(\alpha_i)/P_{min}\alpha_i$ when the node follows the optimal power mapping, and for three different sets of values for $\mu_{min}$ and $\mu_{min}$. It can be seen that the transmitted power also is discontinuous. Furthermore, the transmitted power is not monotonically non-decreasing function of the metric.

Concurrent Transmissions from n+1 Nodes

In general, when n+1 nodes transmit concurrently, the optimal power mapping has discrete power levels. The levels are determined iteratively starting from level $q_0 \mu_{min}$. Given a set of levels, each possible combination of the nodes n at these levels leads to a possibly new and larger power level that can overcome the interference from the n interfering nodes. To determine the received power levels, we define the set $Q_0 = \{P_{min}\}$, and we construct a set $Q_{k+1}$ based on the elements in the set $Q_k$. The set of all possible sets of n levels selected from the set $Q_k$ that the n nodes can occupy is $\Omega_k$. Then, $$Q_{k+1} = Q_k \cup \left\{ q : q = \bar{\gamma}\left(\sum_{x \in \omega} x + \sigma^2\right) < P_{max}, \omega \in \Omega_k \right\}, \quad (12)$$

where x is the power level and $\Omega$ is a set of possible power levels.

This procedure is repeated until no new power level is added to the set. The iteration is guaranteed to terminate. The above iteration leads to a large number of power levels and becomes intractable even for small n. Therefore, we derive a sub-optimal power mapping for the case that has fewer power levels.

Worst-Case Interference from n Other Nodes

The power levels are set so as to ensure that the packet 431 transmitted 430 by best node can be decoded successfully even in a worst-case interference scenario in which the power received from each of the other n contending nodes is just one level below the received power of the best node. In this case, the power levels are $$q_{n,i} = \bar{\gamma}(n q_{n,i-1} + \sigma^2), i \in \{1, 2, \ldots, L_n\}, \quad (13)$$

where $q_{n,0} = P_{min}$, and $L_n$ is the index of the largest power level. Solving for $q_{n,i}$ explicitly, we obtain $$q_{n,i} = (n\bar{\gamma})^i P_{min} + \sigma^2 \bar{\gamma} \frac{(n\bar{\gamma})^i - 1}{n\bar{\gamma} - 1}, i \in \{0, 1, \ldots, L_n\}, \quad (14)$$

Using the maximal power constraint, it follows that $$L_n = \max\left\{ l \in Z : \left( (n\bar{\gamma})^l + \frac{(n\bar{\gamma})^l - 1}{n\bar{\gamma} - 1} \right) P_{min} \le P_{max} \right\}. \quad (15)$$

Setting n=1 leads to Equation (5). We can maximize the probability of success for the best node. Recall that metric 411 in the half-closed interval $[m_i, m_{i+1})$ 401 is mapped 420 to the received power 423 $q_i$, for $0 \le i \le L_n$, and $m_0 = \mu_{min}$ and $mL_{n+1} = \mu_{max}$. Then, the probability of success, in closed-form, is $$p_{succ}^n = \sum_{i=1}^{L_n} Pr$$

(one metric lies in $[m_i, m_{i+1})$, other n metrics are less than $m_i$), $$= \frac{1}{(\mu_{max} - \mu_{min}) L_{n+1}} \sum_{i=1}^{L_n} \binom{n+1}{1} (m_{i+1} - m_i)(m_i - m_0)^n, \quad (16)$$

As above, the support can be optimized to maximize the probability of success. The optimal support that maximizes $P_{succ}^n$ can be characterizes as follows. When the metric is uniformly distributed in the half-closed interval $[\mu_{min}, \mu_{max})$, the support that maximizes $Pn_{succ}$ in Equation (16) is $$m_i = \mu_{min} + (\mu_{max} - \mu_{min}) \prod_{j=i}^{L_n} t_j,$$

for $i \in \{1, 2, \ldots, L_n\}$, where dimensions-less quantities t are defined recursively as $$t_1 = \frac{n}{n+1} \text{ and } t_i = \frac{n}{n+1 - t_{i-1}^n}. \quad (17)$$

The proof is given in Appendix C.

Figure 3:
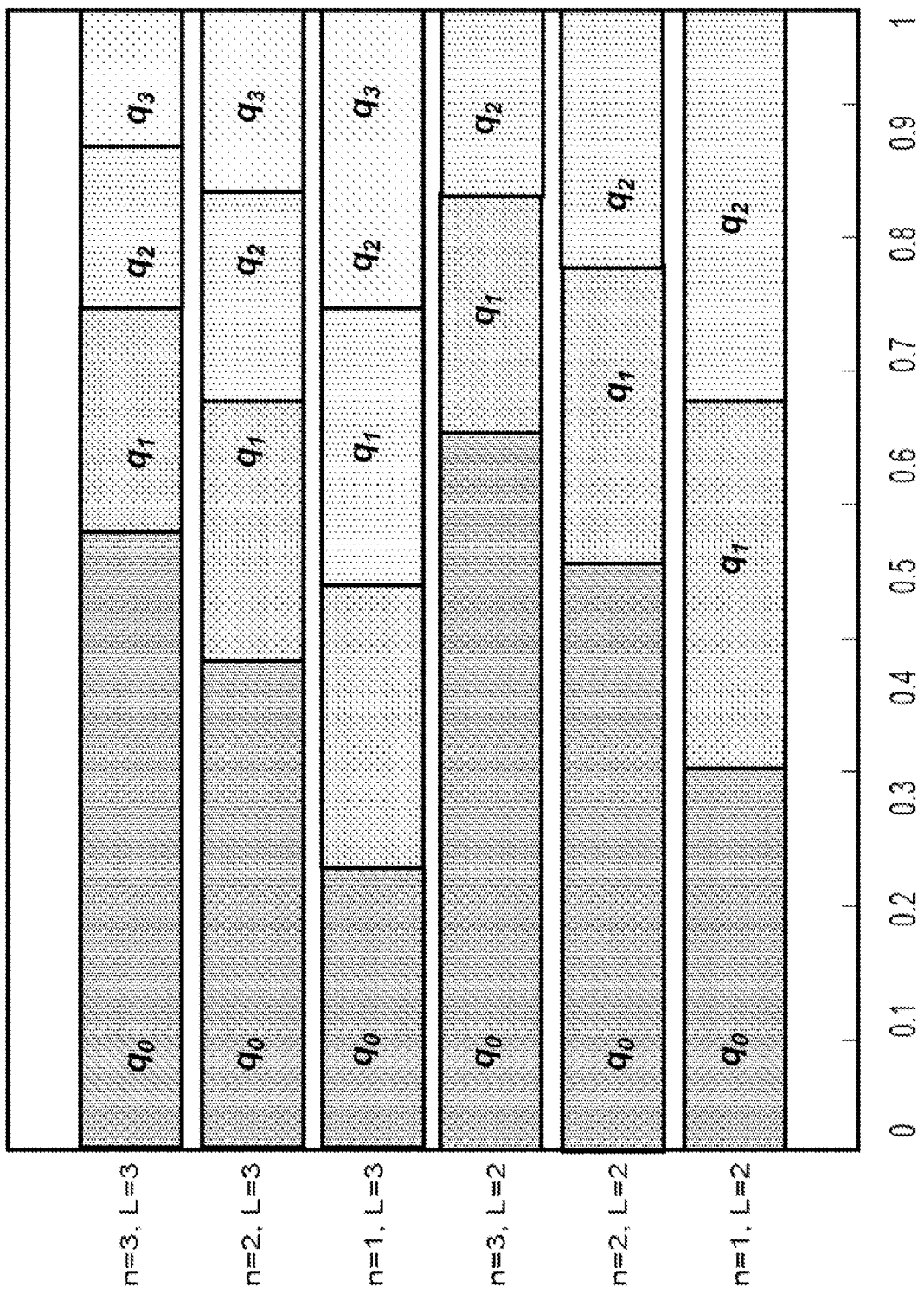
FIG. 3 chart of power levels as a function of the metrics according to an embodiment of the invention.

FIG. 3 shows the optimal support for different combinations of nodes n and levels L. The largest value of L depends on $P_{min}$ and $P_{max}$. Notice that for n=1, the solution reduces to the equal support case.

Interference from an Unknown Number of Nodes

Above, the power levels are set so as to successfully overcome the interference from n adversary nodes. During practical multiple access, the actual number of nodes that transmit in a slot is, in general, a random variable that takes values between 0 and N. Therefore, we set the power levels using $$q_{a,i} = (\alpha \bar{\gamma})^i P_{min} + \sigma^2 \bar{\gamma} \frac{\bar{\gamma}^i - 1}{\bar{\gamma} - 1}, \quad 0 \le i \le L_a, \quad (18)$$

where $a \ge 1$, $a \in R$, is called the adversary order. The number of power levels $L_n$ depends on $P_{max}$, and the levels are set according to the adversary order a. A node with the metric μ ensures that the received power is according to the following power mapping $$\pi(\mu) = q_{a,i}, \text{ if } m_i \le \mu < m_{i+1}, \quad (19)$$

where $\{m_0, \ldots, mL_{a+1}\}$ is the support.

This ensures that the packet from the best node is always decoded successfully when at most $\lfloor a \rfloor + 1$ nodes transmit, and only one node transmits at the highest possible power level. This leads to the following lower bound for the probability of success, $$S_k^a = \begin{cases} \dfrac{1}{(\mu_{max} - \mu_{min})L_{n+1}} \sum_{i=1}^{L_n} \binom{k+1}{1}(m_{i+1}^a - m_i^a)(m_i^a - m_0^a)^k, & 1 \le k \le \lfloor a \rfloor + 1 \\ 0, & k = 0, k > \lfloor a \rfloor + 1 \end{cases} \quad (20)$$

This lower bound assumes that successful decoding never occurs when the number of transmitting nodes exceeds $\lfloor a \rfloor + 1$. This bound is quite tight. Henceforth, specifying the adversary order and the support fully defines the power mapping function.

There are several interesting trade-offs that occur in selecting the appropriate adversary order a. While increasing a increases the gap between the power levels, and thus improves the odds of successful decoding, increasing a can reduce the number of levels $L_a$ because the received power levels must lie between $P_{min}$ and $P_{max}$, which instead increases the probability of a failed decoding. Another trade-off occurs in determining the support. While optimizing the support for $\lfloor a \rfloor + 1$ contending nodes results in the best probability of success when exactly $\lfloor a \rfloor + 1$ nodes transmit, it decreases the probability of success when fewer nodes transmit. Therefore, it makes sense to decouple the optimization of the support from the optimization of a.

These trade-offs are described below, and form an important role in the design of the overall multiple access selection method according to the embodiments of our invention.

Variable Power Multiple Access Selection Method

As shown in FIG. 4, our selection method controls the number of nodes that transmit 430 during any one time slot so as to improve the probability of successfully 441 decoding the packet 431 transmitted by the best node. Controlling the number of nodes that transmit is important because more steps are required to find the best node if too few nodes transmit in each time slot. If too many nodes transmit concurrently, then the interference increases and reduces the probability of a successful decoding.

The power mapping $\pi$ 420 matters because the success probability suffers significantly when more nodes transmit than assumed, when setting the power levels. On the other hand, assuming a pessimistically large number of nodes in determining the power levels is also not desirable because that reduces the number of power levels available, and thus reduces the ability to decode the packet from the best node. Our method proceeds through a sequence of steps and eventually results in the successful decoding of the packet transmitted by the best node. In each step, only nodes whose metric is in the predefined half-closed interval 401 transmit 430.

At the end of each time slot, the receiver broadcasts one of three outcomes 438 to all nodes: success 441, idle 442, or collision 443. Depending on the outcome, the half-closed interval 401 is updated, as described below. Each node can do this updating independently without any feedback other than idle, success, or collision from the receiver 450.

The method as described below uses the uniformly distributed metric in a normalized half-closed interval [0, 1) in order to simplify the description. Appendix D describes a complete generalized to the case in which the metric has an arbitrary non-uniform CDF. Note that the invention applies to the case of more general distributions of the metric, as well.

To specify the protocol precisely and optimize its performance, we define the following three variables: $\mu_{base}(k)$, $\mu_{max}(k)$, and $\mu_{min}(k)$. $\mu_{base}(k)$ is the lowest possible value of the best metric and $\mu_{max}(k)$ is the maximum of the best metric, at the beginning of step (time slot) k. In step k, all nodes with metrics above $\mu_{min}(k)$, and necessarily below $\mu_{max}(k)$, transmit 430 a packet 431. The supports are conditioned on the fact that the metrics is between $\mu_{min}(k)$ and $\mu_{max}(k)$. For example, for the equal support case, in step k, $$m_i = \mu_{min}(k) + \left(\frac{\mu_{max}(k) - \mu_{min}(k)}{L+1}\right)i, \text{ for } 0 \le i \le L+1.$$

We also define z(k) as the probability that an arbitrary node transmits in step k. The most likely estimate of the number of nodes with metrics between $\mu_{base}(k)$ and $\mu_{max}(k)$ is m(k).

Initialization

At the beginning of the method, the best metric can lie anywhere between $\mu_{min}$ and $\mu_{max}$. Therefore, $\mu_{base}(1) = 0$ and $\mu_{max}(1) = 1$. Initially, the metrics for all N nodes are between $\mu_{base}(1)$ and $\mu_{max}(1)$. Therefore, m(1) = N.

With these initial values, z(1) is determined automatically by the relationships given below.

Relationships

Given m(k) and z(k), the probability of success ($P^{succ}$) in during time slot k is lower bounded by $$P^{succ}(k) = \sum_{r=1}^{m(k)} S_{r-1}^a \binom{m(k)}{r} z(k)^r (1-z(k))^{m(k)-r}. \quad (21)$$

The parameters are updated so as to maximize the probability of success in each time slot. To achieve this, it follows from Equation (21), that the transmission probability, z(k), needs to be set as $$z(k) = \arg\max_z \sum_{r=1}^{m(k)} S_{r-1}^a \binom{m(k)}{r} z^r (1-z)^{m(k)-r}. \quad (22)$$

Given that all nodes with metrics that lie between $\mu_{min}(k)$ and $\mu_{max}(k)$ transmit, the transmission probability z(k) is entirely determined by the state variables through $z(k) = (\mu_{max}(k) - \mu_{min}(k))/(\mu_{max}(k) - \mu_{base}(k))$.

Therefore, $$\mu_{min}(k) = \mu_{max}(k) - (\mu_{max}(k) - \mu_{base}(k))z(k). \quad (23)$$

Method Steps

At the beginning of each time slot k, the method proceeds as follows:

A node i sets 410 the metric $\mu_i$ indicating a need to transmit a packet to the receiver according to the half-closed interval $[\mu_{min}(k), \mu_{max}(k))$ 401. The node maps 420 the metric to the receive power level 423 as $P_R = \pi(\mu_i)$ using Equation (19). Then, the node transmits 430 the packet 431 at the transmit power $P_T$ 421 so that the desired received power level $P_R$ 423 is achieved. If the metric maps to a power level of zero, then the node does transmit at all.

When nodes transmit in this manner, this causes the concrete, useful and tangible result that the best node is selected within 1.4 to 2.0 time slots on the average. This is considerably faster than the 2.5 slot average achieved by conventional methods.

In response to the transmitting 430, the receiver 450 generates the outcome 439. If the outcome of the transmission is success 441, then the packet from the best node has been decoded, and the half-closed interval 401 is kept constant for the next time slot k+1.

Figure 5:
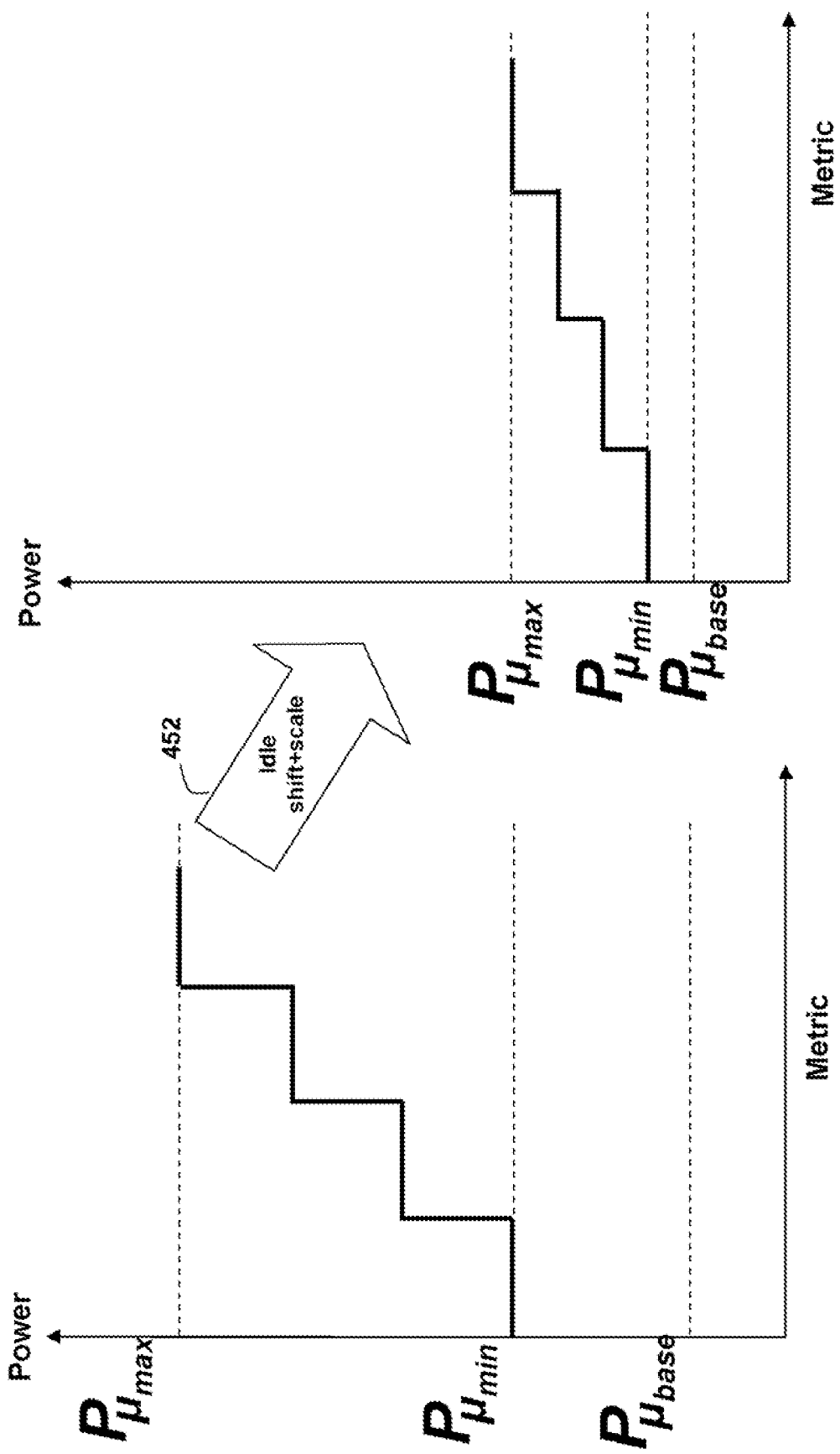
FIG. 5 is a block diagram of parameters updating when the network is idle according to an embodiment of the invention.

If the outcome is idle 442 as shown in FIG. 5, then no node transmitted a packet during the current time slot. This implies that all of the nodes have metrics in the half-closed interval $[\mu_{base}(k), \mu_{min}(k))$, and the number of nodes that have metric in the half-closed interval $\{\mu_{base}(k+1), \mu_{max}(k+1))$ remains unchanged. This means that the half-closed interval in the next time slot k+1 can be shifted down 452, and perhaps scaled as shown in FIG. 5. Hence optimally, $\mu_{max}(k+1)=\mu_{min}(k)$, $\mu_{base}(k+1)=\mu_{base}(k)$, m(k+1)=m(k) from Equation (22), z(k+1)=z(k), and $\mu_{min}(k+1)$ is shifted according to Equation (23).

Figure 6:
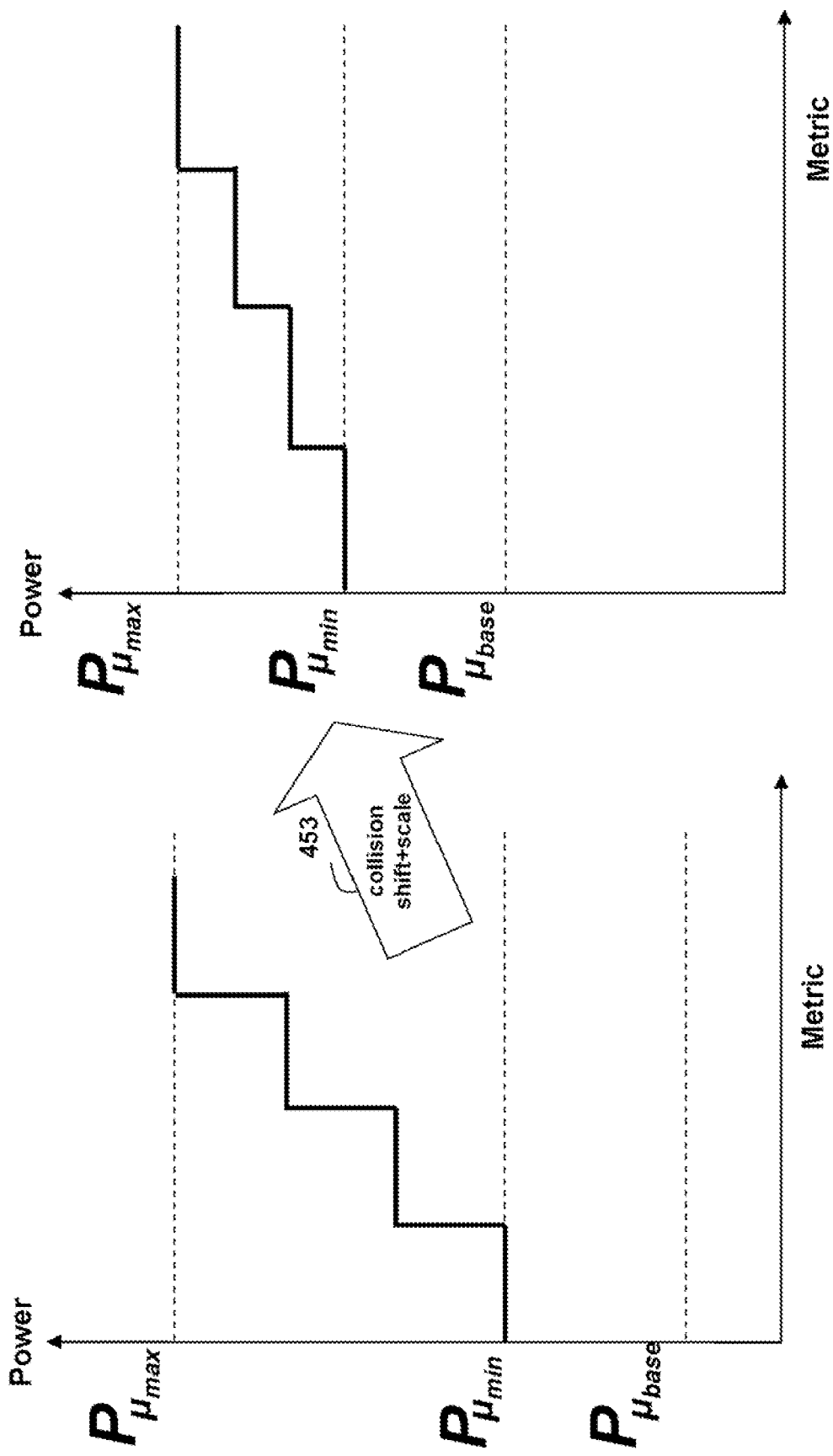
FIG. 6 is a block diagram of parameters updating when the network experiences collisions according to an embodiment of the invention.

If the outcome is a collision 443 as shown in FIG. 6, then the half-closed interval is shifted up 452 because the best metric lies between $\mu_{min}(k)$ and 82 $_{max}(k)$. Hence optimally, we set $\mu_{max}(k+1)=\mu_{max}(k)$, $\mu_{base}(k+1)=\mu_{min}(k)$, and $\mu_{min}(k)$ can be increased. Furthermore, m(k+1), the most likely number of nodes between $\mu_{max}(k+1)$ and $\mu_{base}(k+1)$ is $$m(k+1) = \arg\max_{2 \le r \le m(k)} \binom{m(k)}{r} z(k)^r (1-z(k))^{m(k)-r}(1 - S_{r-1}^a). \quad (24)$$

The values z(k+1), and consequently $\mu_{min}(k+1)$, are determined Equations (22-23).

Power-Based Splitting

The above method can be improved when the receiver 450 estimates the total power of all signals received from the nodes during a time slot. This can be done by measuring a received signal strength indicator (RSSI), i.e., the energy integral and not the quality. This is especially useful in the event of collisions because the total received power is indicative of the interval in which the maximal metric value lies. This is so because the gap between adjacent power levels given by the mapping function $\pi(\cdot)$ 422, as in Equation (19), increases exponentially with $a\bar{\gamma}$.

Therefore, the signal from the power level that is the largest among the levels selected by the nodes, comprises the bulk of the received signal power $P_T$ 423. For example, in lightly coded systems, the SINR threshold, $\bar{\gamma}$, is in the order of 6-15 dB, which implies that $a\bar{\gamma}>4$. Therefore, four or more interferers need to transmit with the same received power in order for the receiver to mistake that the received power is caused by a single node at a largest received power level This is extremely unlikely.

Therefore, the receiver can assume, with high probability, that the total received power in step k, $P^{tot}(k)$ includes the power from at least one node whose received power is at the largest level below $P^{tot}(k)$. Hence, the receiver can invert the power mapping as $\pi^{-1}$ 422 to determine the half-closed interval in which metric lies. This information can be used to better control how many nodes transmit in the next time slot step k+1.

Formally, the receiver 450 assumes that the metric of the best node lies in the half-closed interval $[m_{J(k)}, m_{J(k)+1})$, where J(k) is an estimate of the received power of the best node. The received power $P_R$ 423 is selected as the power that is closest to $P_{tot}(k)$:

$$J(k) = \max\left\{0 \le i \le L_a : (a\bar{\gamma})^i P_{min} + \sigma^2 \bar{\gamma} \frac{\bar{\gamma}^i - 1}{\bar{\gamma} - 1} \le P^{tot}(k)\right\}. \quad (25)$$

Although the above estimate is good, the estimate does need to be correct always. For example, the power estimate J can be too high when many nodes transmit concurrently. In the case when no node transmits, the estimated power J is decreased. Therefore with splitting, the response to an idle outcome differs depending on whether a collision has occurred previously or not.

If there has not been a collision previously, the idle outcome is handled as before. However, if a collision has occurred previously, the power estimate J(k) is too high. Then, the receiver decrements J(k) in the next time step, and broadcasts the estimate J(k) 451.

Therefore, the method maintains two state variables $\mu_{min}(k)$ and $\mu_{max}(k)$. In addition, the method determines m(k), z(k), and J(k). Given that the receiver assumes that the best metric lies between $[m_{J(k)}, m_{J(k)+1})$, $\mu_{base}(k)$ is no longer useful and is set to zero. At each time slot k, the improved method proceeds as follows for uniform metrics. The non-uniform metric case is further described in Appendix D.

A node i with metric $\mu_i$ transmits if the metric $\mu_i$ is in the half-closed interval $[\mu_{min}(k), \mu_{max}(k))$, such that the power of the received signal, $\pi(\mu_i)$ is as per Equation (19). The support is updated as a function of $\mu_{min}(k)$ and $\mu_{max}(k)$. If the outcome is success, then the process terminates for this time slot. If the outcome is a collision, then the receiver 430 determines the estimate J(k) from the total received power $P^{tot}(k)$ using Equation (25), and broadcasts J(k) 451 as an estimate of the power level of the best node. Consequently, $$\mu_{min}(k+1) = \mu_{min}(k) + \frac{\mu_{max}(k) - \mu_{min}(k)}{L_a + 1} J(k), \quad (26)$$

And $$\mu_{max}(k+1) = \mu_{min}(k) + \frac{\mu_{max}(k) - \mu_{min}(k)}{L_a + 1} (J(k) + 1). \quad (27)$$

If the outcome is idle and no collision has occurred so far, $\mu_{max}(k+1)=\mu_{min}(k)$, m(k+1)=N, and z(k+1)=z(k). As before, $\mu_{min}(k+1)$ is determined using Equation (23).

If the outcome is idle and a collision has occurred previously, the receiver also broadcasts J(k)=J(k−1)−1. The most likely half-closed interval in which the maximal metric resides is then the metric corresponding to the index that is one less than the previous estimate. Hence, $\mu_{max}(k+1)=\mu_{min}(k)$, and $\mu_{min}(k+1)=\mu_{min}(k)-(\mu_{max}(k)-\mu_{min}(k))=2\mu_{min}(k)-\mu_{max}(k)$.

Effect of the Invention

The invention solves the problem of contention-based multiple access selection in which the goal is to find the node with the best metric, e.g., best channel, by successfully decoding its signal. Multiple access performance changes drastically when the method takes into account local channel state information, decoding success, and power control, The best strategy is to transmit in such a way that the received power falls into one of a set of discrete levels, and optimized those levels and their mapping onto the metrics. However, other metric to power mappings are also possible. The method enables effective multiple access selection by dynamically adjusting the power levels depending on whether previous transmission attempts with success, idle, or collision outcomes. In one embodiment, the method uses the received signal strength information at the receiver to improve the operation of the transmitting nodes.

The invention can be used for more effective and faster random access in systems with multi-user diversity, which is important for high-speed data transmission, as well as for the association and setup phase for any wireless network.

In another application, the method achieves fast relay selection in cooperative communication systems without having to resort to inefficient centralized poling mechanisms.

Although, the invention, and particularly the metrics and power levels have been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix A

Without loss of generality, we assume that $\mu_a \leq \mu_b$, and set $\delta = \mu_b - \mu_a$. From order statistics of uniform random variables, the probability distribution functions (pdfs) of $\mu_a$ and $\delta$ conditioned on $\mu_a$ are $$p(\mu_a) = \frac{2(\mu_{max} - \mu_a)}{(\mu_{max} - \mu_{min})^2}, \quad \mu_{min} \leq \mu_a \leq \mu_{max} \tag{28}$$

$$p(\delta|\mu_a) = \frac{1}{\mu_{max} - \mu_a}, \quad 0 \leq \delta \leq \mu_{max} - \mu_a. \tag{29}$$

For any power mapping $\pi(.)$, a successful decoding occurs only if the power ratio satisfies $$\frac{\pi(\mu_a + \delta)}{\pi(\mu_a) + \sigma^2} \geq \bar{\gamma}. \tag{30}$$

The smallest value of $\mu$ at which $\pi(\mu) \geq x$ is $\pi^{inv}(x)$. Given that $\pi(.)$ is monotonic non-decreasing, this implies that $\pi(\mu) \geq x$ for all $\mu \geq \pi^{inv}(x)$.) Therefore, for a given $\mu_a$, the decoding is successful for all $\delta \geq \pi^{inv}(\bar{\gamma}\pi(\mu_a) + \bar{\gamma}\sigma^2) - \mu_a$. The above definitions hold even for a discontinuous (but monotonic non-decreasing) $\pi$. For any (monotonic non-decreasing) power mapping $\pi$, the general expression for probability of success is $$P^{\pi}_{succ} = \int_{\mu_{min}}^{\mu_{max}} \int_{\min(\pi^{inv}(\bar{\gamma}\pi(\mu_a)+\bar{\gamma}\sigma^2)-\mu_a,\mu_{max}-\mu_a)}^{\mu_{max}-\mu_a} \frac{2(\mu_{max}-\mu_a)}{(\mu_{max}-\mu_{min})^2} \frac{1}{\mu_{max}-\mu_a} d\delta d\mu_a \tag{31}$$

$$= \frac{2}{(\mu_{max}-\mu_{min})^2} \int_{\mu_{min}}^{\mu_{max}} [\mu_{max} - \pi^{inv}(\bar{\gamma}\pi(\mu_a)+\bar{\gamma}\sigma^2)]^+ d\mu_a \tag{32}$$

We assume that the optimal solution is $\pi(\mu_{min}) = P_{min}$. Given any optimal solution, we can always construct a new mapping $\pi^*(.)$ such that $\pi^*(\mu_{min}) = P_{min}$, and $\pi^*(\mu) = \pi(\mu)$ for all $\mu \in (\mu_{min}, \mu_{max}]$. Doing so guarantees that $\pi^{*inv}(\bar{\gamma}\pi^*(\mu_a)+\bar{\gamma}\sigma^2) \leq \pi^{inv}(\bar{\gamma}\pi(\mu_a)+\bar{\gamma}\sigma^2)$, and thus ensures that $P^{\pi^*}_{succ} \geq P\pi_{succ}$.

If $(P_{max})/P_{min}+\sigma^2 < \bar{\gamma}$, then $P^{\pi}_{asucc}$ is always zero for any mapping. Otherwise, let $m_1$ be the smallest value at which $\pi(m_1) \geq q_1$, where $q_1 = \bar{\gamma}(P_{min}+\sigma^2)$ as defined in Equation (6). If $\pi(.)$ does not have such a value, then the probability of success is zero. This implies that the mapping $\pi$ is necessarily suboptimal as a trivial modification of it such as setting $\pi(\mu) = P_{max}$, for $(\mu_{max}-\mu_{min})/2 \leq \mu \leq \mu_{max}$, results in non-zero probability of success.

Consider an alternate mapping $\pi^*$ in which $$\pi_*(\mu) = \begin{cases} P_{min}, & \mu_{min} \leq \mu < m_1 \\ \pi(\mu), & m_1 \leq \mu \leq \mu_{max}. \end{cases} \tag{33}$$

The probability of success of $\pi$ in Equation (32) can be upper bounded as $$P^{\pi}_{succ} = \frac{2}{(\mu_{max}-\mu_{min})^2} \int_{\mu_{min}}^{m_1} [\mu_{max} - \pi^{inv}(\bar{\gamma}\pi(\mu_a)+\bar{\gamma}\sigma^2)]^+ d\mu_a + \tag{34}$$

$$\frac{2}{(\mu_{max}-\mu_{min})^2} \int_{m_1}^{\mu_{max}} [\mu_{max} - \pi^{inv}(\bar{\gamma}\pi(\mu_a)+\bar{\gamma}\sigma^2)]^+ d\mu_a \leq$$

$$\frac{2}{(\mu_{max}-\mu_{min})^2} \int_{\mu_{min}}^{m_1} [\mu_{max} - m_1]^+ d\mu_a +$$

$$\frac{2}{(\mu_{max}-\mu_{min})^2} \int_{m_1}^{\mu_{max}} [\mu_{max} - \pi_*^{inv}(\bar{\gamma}\pi_*(\mu_a)+\bar{\gamma}\sigma^2)]^+ d\mu_a \tag{35}$$

$$= P^{\pi_*}_{succ} \tag{36}$$

where $[x]^+ = \max(x, 0)$. The inequality in Equation (35) follows because the mapping $\pi$ is MND, which implies that $\pi^{inv}(\bar{\gamma}\pi(\mu)+\bar{\gamma}\sigma^2) \geq m_1+\bar{\gamma}\sigma^2$, for all $\mu_{min} \leq \mu < m_1$. Furthermore, from Equation (33), $\pi^{*inv}(\bar{\gamma}\pi^*(\mu)+\bar{\gamma}\sigma^2) = \pi^{inv}(\bar{\gamma}\pi(\mu)+\bar{\gamma}\sigma^2)$, for all $m_1 \leq \mu \leq \mu_{max}$. Thus, the inequality shows that a flat mapping $\pi$ for $\mu^*[\mu_{min}, m_1)$ has the highest success probability.

We now use the above argument successively to show that the optimal function $\pi$ maps the metric values into a discrete set of received power levels. Let $m_0 = \mu_{min}$. Assume that the optimal $\pi$ maps metrics in the half-closed interval $[m_i, m_{i+1})$ to power levels $q_i$, for $0 \leq i \leq k$, for some $k \leq L$. The previous paragraph proved that the assumption is true for $k = 0$. Define $q_{k+1} = \bar{\gamma}q_k + \bar{\gamma}\sigma^2$, and $m_{k+1} = \pi^{inv}(q_{k+1})$. If $q_{k+1} \leq P_{max}$, then the probability of success is $$P_{succ}^{\pi} = \sum_{j=0}^{k} \frac{2}{(\mu_{max} - \mu_{min})^2} \int_{m_j}^{m_{j+1}} [\mu_{max} - m_j]^+ d\mu_a + \quad (37)$$

$$\frac{2}{(\mu_{max} - \mu_{min})^2} \int_{m_{k+1}}^{\mu_{k+2}} [\mu_{max} - \pi^{inv}(\bar{\gamma}\pi(\mu_a) + \bar{\gamma}\sigma^2)]^+ d\mu_a +$$

$$\frac{2}{(\mu_{max} - \mu_{min})^2} \int_{m_{k+2}}^{\mu_{max}} [\mu_{max} - \pi^{inv}(\bar{\gamma}\pi(\mu_a) + \bar{\gamma}\sigma^2)]^+ d\mu_a$$

As before, the middle term in the expression is upper bounded by $$\frac{2}{(\mu_{max} - \mu_{min})^2} \int_{m_{k+1}}^{m_{k+2}} [\mu_{max} - m_{k+1}]^+ d\mu_a,$$

(38) with equality if the function $\pi$ maps $[m_k, m_{k+1}]$ to $q_k$.
As before, this mapping does not affect the first and third term in the expression.

When $k = L$, it follows from Equation (5) that $q_{k+1} > P_{max}$. For this case, the probability of expression has the same form as Equation (37), except that it lacks the third term. Again, reducing all power levels to $q_L$ for $\mu \geq m_L$ does not affect $P^{succ}$. Hence, the desired result is achieved.

Appendix B

We know that the optimal power mapping is discrete and includes $L+1$ levels. Let $m_0 = \mu_{min}, m_1, \ldots, m_L, m_{L+1} = \mu_{max}$ denote the support of the MND power mapping, such that $\pi(\mu) = q_i$ whenever $\mu \in [m_i, m_{i+1})$, for $i = \{0, 1, \ldots, L\}$. The power levels are such that when $\mu = [m_j, m_{j+1}]$ for some j, then the packet from node b can be decoded successfully for all $\mu_b \geq m_{j+1}$. Therefore, the probability of success expression in Equation (31) can be simplified as $$P_{succ}^{\pi} = \frac{2}{(\mu_{max} - \mu_{min})^2} \sum_{i=1}^{L+1} \int_{m_{i-1}}^{m_i} \int_{m_i - m}^{\mu_{max} - m} d\delta d\mu_a \quad (39)$$

$$= \frac{2}{(\mu_{max} - \mu_{min})^2} \sum_{i=1}^{L+1} (m_i - m_{i-1})(\mu_{max} - m_i).$$

The goal is to find the support $\{m_i\}_{i=1}^{L}$ that maximizes $P_{succ}^{\pi}$. By using the first order condition, we can show that the optimal support is $$m_i = \mu_{min} + \left(\frac{\mu_{max} - \mu_{min}}{L+1}\right)i, \quad i \in \{1, 2, \ldots, L\}. \quad (40)$$

Appendix C

When we rearrange the first order condition of (16), we get the following recursions $$\frac{m_1 - m_0}{m_2 - m_0} = \frac{n}{n+1}, \text{ and} \quad (41)$$

$$\frac{m_i - m_0}{m_{i+1} - m_0} = \frac{n}{n + 1 - \left(\frac{m_{i-1} - m_0}{m_i - m_0}\right)^n}, \quad i \in \{2, 3, \ldots, L_n\}. \quad (42)$$

We define $t_i = (m_i - m_0)/(m_{i+1} - m_0)$. The recursion gives an analytical solution for $t_{Ln}$ in terms of n. It can be used to solve for $m_{Ln}$, because $m_0 = \mu_{min}$ and $m_{Ln+1} = \mu_{max}$. After $m_{Ln}$ is found, it can then be used to determine $m_{Ln-1}$, and so on.

Appendix D

In general, the metric $\mu_i$ lies in the half-closed interval $[\mu_{min}, \mu_{max})$ and has a CDF $F(\mu_i)$. We know that $F(\mu_{min}) = 0$ and $F(\mu_{max}) = 1$. When the metric is not uniformly distributed in the half-closed interval $[0, 1)$, the method can be generalized as follows. The method continues to use the state variables $\mu_{base}(k)$, $\mu_{min}(k)$ and $\mu_{max}(k)$. However, now we interpret the metrics as percentile values. Hence, the power-mapping is modified to $$\pi(\mu_i) = q_{a,i}, \text{ if } m_i \leq F(\mu_i) < m_{i+1},$$

(43) where $q_{a,i}$ is given by Equation (18).

Formally, each node determines a metric that describes a 'priortiy' of sending a packet, and the best node is the one with the highest metric, In the case of multi-user diversity in cellular systems, the metric of each node is directly proportional to the overall path gain or the short-term fading gain. in the case of relaying, the metric depends not only on the source to relay channel but also on the relay to destination channel.

We claim:

1. A method for transmitting a packet in a wireless network of nodes, comprising in a node at a beginning of a scheduled time slot:
   setting a metric in the node, in which the metric indicates a need to transmit a packet to a receiver in the wireless network;
   mapping the metric to a received power level, in which the mapping is defined over a half-closed interval of metrics; and
   transmitting the packet at a transmit power level so that the received power level is achieved at the receiver.

2. The method of claim 1, in which the mapping is monotonically non-decreasing.

3. The method of claim 1, in which the mapping has discrete power levels.

4. The method of claim 1, in which the network is selected from a group consisting cellular, relay, mobile, ad hoc, sensor network, cooperative, and collaborative networks.

5. The method of claim 1, in which the receiver is a base station.

6. The method of claim 5 further comprising:
   keeping the interval constant if the outcome is a success.

7. The method of claim 1, in which a best node has a highest need to transmit, a highest metric, and a largest received power level.

8. The method of claim 7, in which the highest metric is based on a group of criteria consisting of local channel measurements, priority, SNIR, amount of data to transmit, real-time feedback, power reduction, increased bandwidth, extending network range and combinations thereof.

9. The method of claim 1, further comprising at an end of the time slot:
   receiving an outcome from the receiver; and
   adjusting the interval as a function of the outcome.

10. The method of claim 9, further comprising:
    shifting the interval up if the outcome is collision.

11. The method of claim 9, further comprising:
    shifting the interval down if the outcome is idle.

12. The method of claim 9, further comprising:
    scaling the half-closed interval.

13. The method of claim 1, in which the metrics are is uniformly distributed in the half-closed interval.

14. The method of claim 1, in which the mapping is to (L +1) discrete power levels in a set $Q=\{q, q_1, \ldots, q_L\}$, such that $$L = \left\lfloor \log_{\bar{\gamma}}\left(\frac{(\bar{\gamma}-1)P_{max} + P_{min}}{\bar{\gamma}P_{min}}\right)\right\rfloor, \text{ and}$$

$$q_i = \bar{\gamma}^i P_{min} + \sigma^2 \bar{\gamma}\frac{\bar{\gamma}^i - 1}{\bar{\gamma} - 1}, \quad 0 \leq i \leq L,$$

where $\bar{\gamma}$ is a signal interference plus noise ratio, $\sigma^2$ is a power of noise, and $P_{min}$ and $P_{max}$ are minimal and maximal power levels.

15. The method of claim 1, in which the interval is determined according to $$m_i = \mu_{min} + \left(\frac{\mu_{max} - \mu_{min}}{L+1}\right)i, \, 0 \leq i \leq L+1,$$

$\mu_{min}$ is a minimal metric, $\mu_{max}$ is a maximal metric, and L is a number of power levels.

16. The method of claim 15, in which L is $$\left\lfloor \log_{\bar{\gamma}}\left(\frac{(\bar{\gamma}-1)P_{max} + P_{min}}{\bar{\gamma}P_{min}}\right)\right\rfloor,$$

where $P_{max}$ is a maximal power level, $P_{min}$ is a minimal power level and $\bar{\gamma}$ is a threshold of a signal interference plus noise ratio.

17. The method of claim 1, further comprising:
estimating a total received power at the receiver; and
broadcasting an estimated total received power.

18. The method of claim 17, further comprising:
adjusting the interval according to the total received power.

19. The method of claim 1, in which the transmit power level is zero.

20. The method of claim 1, in which a spacing between the discrete power levels depends on an uncertainty in the metric.

* * * * *